US011528353B2

(12) United States Patent
Choi et al.

(10) Patent No.: US 11,528,353 B2
(45) Date of Patent: Dec. 13, 2022

(54) ELECTRONIC DEVICE INCLUDING FINGERPRINT SENSOR

(71) Applicant: Samsung Electronics Co., Ltd., Gyeonggi-do (KR)

(72) Inventors: Bongsuk Choi, Gyeonggi-do (KR); Sungjoo Cho, Gyeonggi-do (KR); Daeyoung Noh, Gyeonggi-do (KR); Jongchul Choi, Gyeonggi-do (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 17/101,068

(22) Filed: Nov. 23, 2020

(65) Prior Publication Data
US 2021/0160354 A1 May 27, 2021

(30) Foreign Application Priority Data
Nov. 25, 2019 (KR) .................. 10-2019-0152602

(51) Int. Cl.
H04M 1/02 (2006.01)
G06F 21/32 (2013.01)
G06V 40/13 (2022.01)

(52) U.S. Cl.
CPC ............ *H04M 1/026* (2013.01); *G06F 21/32* (2013.01); *G06V 40/1318* (2022.01); *H04M 2250/12* (2013.01)

(58) Field of Classification Search
CPC .... H04M 1/026; H04M 2250/12; H04M 1/18; H04M 1/0266; H04M 1/0277;
(Continued)

(56) References Cited

U.S. PATENT DOCUMENTS

2005/0018884 A1 1/2005 Lee et al.
2015/0245514 A1 8/2015 Choung et al.
(Continued)

FOREIGN PATENT DOCUMENTS

CN 109074491 A 12/2018
JP 4189822 B2 12/2008
(Continued)

OTHER PUBLICATIONS

International Search Report dated Mar. 25, 2021.
European Search Report dated Sep. 26, 2022.

*Primary Examiner* — Eugene Yun
(74) *Attorney, Agent, or Firm* — Cha & Reiter, LLC

(57) ABSTRACT

An electronic device includes: a housing including a window facing in a first direction and a rear plate facing in a second direction; a display including a first layer disposed on the window, a second layer disposed on the first layer and having a first opening, and a conductive layer disposed on the second layer and having a second opening corresponding to the first opening; an FPCB disposed on the display and having a third opening corresponding to the second opening; a frame structure disposed between the FPCB and the rear plate and having a fourth opening corresponding to the third opening; a fingerprint sensor having at least a portion inserted into the fourth opening and facing in the first direction; and a dustproof member disposed between the display and the frame structure within a region formed by the third opening.

20 Claims, 10 Drawing Sheets

(58) Field of Classification Search
CPC ... G06F 21/32; G06F 1/1656; G06V 40/1318; G06V 40/1329; G06V 40/12; G02F 1/133311
USPC .................................................... 455/556.1
See application file for complete search history.

(56) References Cited

U.S. PATENT DOCUMENTS

| | | | |
|---|---|---|---|
| 2018/0224990 A1* | 8/2018 | Shim | G06F 3/016 |
| 2018/0314873 A1 | 11/2018 | Yang et al. | |
| 2018/0315803 A1 | 11/2018 | Jin | |
| 2020/0050822 A1* | 2/2020 | Guo | G06V 40/1329 |
| 2020/0203532 A1* | 6/2020 | Yamazaki | H01L 29/45 |
| 2021/0005841 A1* | 1/2021 | Ohta | H05B 33/02 |

FOREIGN PATENT DOCUMENTS

| | | |
|---|---|---|
| JP | 4223465 B2 | 2/2009 |
| KR | 10-1613954 B1 | 4/2016 |
| WO | 2019/130480 A1 | 7/2019 |

* cited by examiner

ELECTRONIC DEVICE INCLUDING FINGERPRINT SENSOR

CROSS-REFERENCE TO RELATED APPLICATION(S)

This application is based on and claims priority under 35 U.S.C. § 119 to Korean Patent Application No. 10-2019-0152602, filed on Nov. 25, 2019, in the Korean Intellectual Property Office, the disclosure of which is herein incorporated by reference in its entirety.

BACKGROUND

Field

One or more embodiments disclosed herein generally relate to an electronic device including a fingerprint sensor.

Description of Related Art

A mobile device may have a fingerprint sensor mounted therein to authenticate a user by matching the user's fingerprints with stored fingerprints for added security.

The fingerprint sensor may be mounted in a lower region of a display. The display may be large enough that it occupies most of the front surface of the mobile device, and various factors, such as the angle of view of the fingerprint sensor, the thickness of the display, and the distance between the display and the fingerprint sensor, should be considered when designing the front surface of the display so that the fingerprint sensor can be mounted to overlap the display yet still function to capture fingerprints.

The fingerprint sensor should have a structure for blocking foreign substances since foreign substances will interfere with the fingerprint sensing operation. Conventionally, foreign substances may be prevented from entering the fingerprint sensor by mounting a dustproof member in a space between a flexible printed circuit board (FPCB) connected with a display panel and a bracket in which the fingerprint sensor is mounted, or by positioning the dustproof member in a space formed by processing the bracket.

The above information is presented as background information only to assist with an understanding of the disclosure. No determination has been made, and no assertion is made, as to whether any of the above might be applicable as prior art with regard to the disclosure.

SUMMARY

Currently in the marketplace, there is a trend towards miniaturized mobile devices, and as such, display panels are becoming thinner. When a fingerprint sensor is mounted under a display panel that is relatively thinner compared to conventional display panels, the distance between the user's fingerprint and the fingerprint sensor may be shortened. As the distance between the user's finger and the fingerprint sensor is shortened, it may be difficult to configure an area large enough for the acquisition of fingerprints even when the fingerprint sensor has a large angle of view.

A space for attaching the dustproof member between the FPCB and the bracket to prevent foreign substances from entering the fingerprint sensor may be narrow. To this end, the bracket may be processed so as to guarantee the space for the dustproof member. However, this processing method is limited by the original thickness of the bracket and other components such as the battery that are mounted in the bracket. If the bracket is processed up to a breaking point, perforations may be formed on the bracket due to machining errors. In addition, even if the bracket is processed up to the breaking point and a dustproof member is mounted therein, there may be difficulty in smoothly preventing foreign substances from entering the fingerprint sensor, and foreign substances may influence other components (for example, the battery) mounted in the bracket.

An electronic device according to an embodiment may include: a housing including a window facing in a first direction and a rear plate facing in a second direction opposite the first direction; a display disposed between the window and the rear plate, the display including: a first layer having a first surface disposed on the window and a second surface that faces in the second direction; a second layer having a third surface disposed on the second surface of the first layer, a fourth surface that faces in the second direction, and a first opening; and a conductive layer having a fifth surface disposed on the fourth surface of the second layer, a sixth surface that faces in the second direction, and a second opening corresponding to the first opening; a flexible printed circuit board (FPCB) extended from at least a portion of the display and disposed on a surface of the display that faces in the second direction, and having a third opening corresponding to the second opening; a frame structure on which the display and the FPCB are seated, and which is disposed between the FPCB and the rear plate and has a fourth opening corresponding to the third opening; a fingerprint sensor having at least a portion inserted into the fourth opening and facing in the first direction; and a dustproof member disposed between the display and the frame structure within the third opening.

An electronic device according to various embodiments may include: a housing including a front cover window and a rear cover; a display panel disposed under the front cover window, and comprising a plurality of layers, at least one first layer of the plurality of layers forming a first opening and a second layer of the plurality of layers forming a second opening; an FPCB electrically connected with the display panel and disposed on a rear surface of the display panel, and comprising a third opening corresponding to the first opening; a fingerprint sensor; a frame structure disposed between the front cover window and the rear cover, and having the fingerprint sensor and the FPCB disposed therein, and comprising a fourth opening corresponding to the third opening; and a dustproof member disposed to surround the fingerprint sensor, and the fingerprint sensor may be disposed to face a front surface of the electronic device to acquire fingerprints of a user through a space formed by the first opening, the second opening, the third opening, and the fourth opening, and the dustproof member may be disposed between the second layer and the frame structure within the third opening.

Additional aspects will be set forth in part in the description which follows and, in part, will be apparent from the description, or may be learned by practice of the presented embodiments.

BRIEF DESCRIPTION OF THE DRAWINGS

The above and other aspects, features, and advantages of certain embodiments of the disclosure will be more apparent from the following description taken in conjunction with the accompanying drawings, in which.

DETAILED DESCRIPTION

Figure 1:
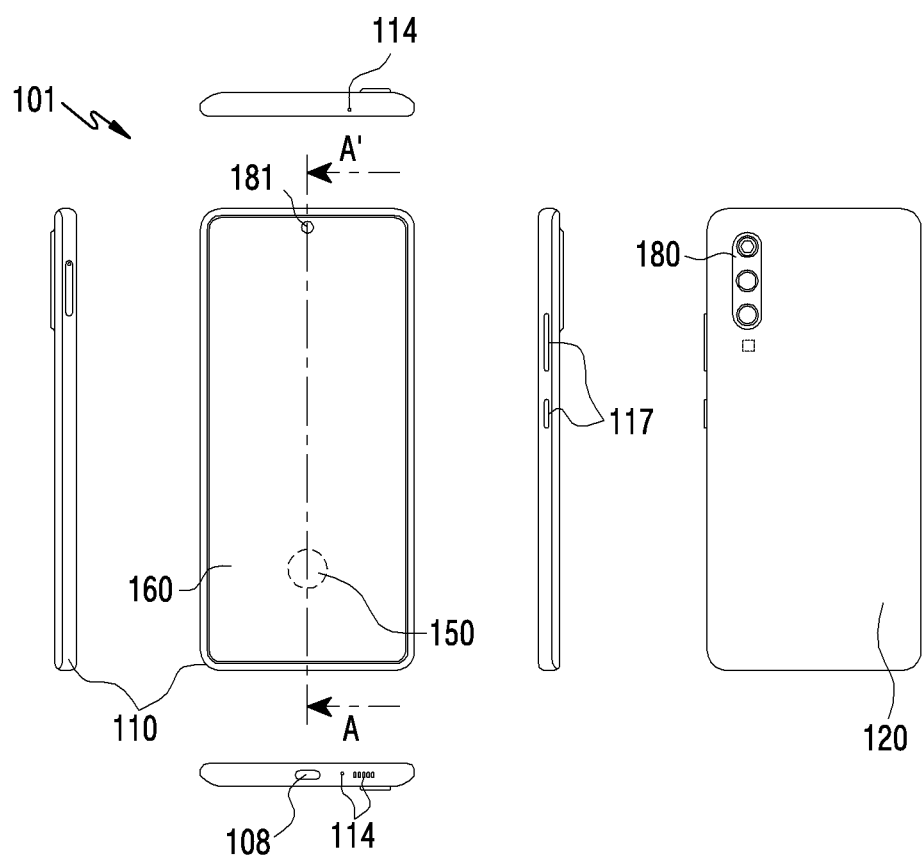
FIG. 1 is a view illustrating an electronic device according to an embodiment.

FIG. 1 illustrates an electronic device 101 according to an embodiment.

Referring to FIG. 1, the electronic device 101 according to an embodiment may include a frame structure 110, a rear cover 120, a display 160, and a fingerprint sensor 150. Herein below, the surface through which the display 160 of the electronic device 101 is seen is defined as the front surface of the electronic device 101, the surface through which the rear cover 120 is seen is defined as the rear surface of the electronic device 101, and the surface extended from an edge of the front surface to an edge of the rear surface is defined as the side surface of the electronic device 101.

In an embodiment, the frame structure 110 may form a portion of the front surface of the electronic device 101, a portion of the rear surface, and the side surface. In another embodiment, when the display 160 is seamlessly extended to a region of the side surface of the electronic device 101 made up of the frame structure 110, the entire front surface of the electronic device 101 may be formed by the display 160, and the side surface may be formed by the display 160 and the frame structure 110. In another embodiment, when the rear cover 120 is seamlessly extended to a region of the side surface of the electronic device 101 made up of the frame structure 110, the side surface of the electronic device 101 may be formed by the frame structure 110 and the rear cover 120. In an embodiment, the frame structure 110 forming the side surface of the electronic device 101 may include a curved surface.

In an embodiment, the frame structure 110 may include metal and/or polymer.

In an embodiment, the frame structure 110 may be coupled with the rear cover 120 to provide a recess (or a space) to have various components (for example, a battery 230) of the electronic device 101 mounted therein.

In an embodiment, the rear cover 120 may form at least a portion of the rear surface of the electronic device 101. In this case, the rear cover 120 may form the majority portion of the rear surface of the electronic device 101, and the other portion of the rear surface may be formed by the frame structure 110. In another embodiment, when the rear cover 120 is extended to a region of the side surface, the entire rear surface of the electronic device 101 may be formed by the rear cover 120.

In an embodiment, the rear cover 120 may be coupled with the frame structure 110. In another embodiment, the rear cover 120 and the frame structure 110 may be integrally formed with each other. In an embodiment, the rear cover 120 may be formed with a substantially opaque material to hide various components mounted in the electronic device 101.

In an embodiment, the rear cover 120 may be formed with, for example, coated or colored glass, ceramic, polymer, metal (for example, aluminum, stainless steel (STS), or magnesium), or a combination of two or more of the above-mentioned materials.

In an embodiment, the rear cover 120 may include an opening formed on a certain region of the rear cover 120. A camera module 180 may be disposed in the opening. The camera module 180 may be disposed in the opening such that at least a portion accommodated in the opening is exposed to the outside of the electronic device 101. The camera module 180 may capture pictures, still images, and/or videos. In an embodiment, the camera module 180 may include at least one lens, at least one image processor, and a flash.

The display 160 according to an embodiment may be disposed to have at least a portion accommodated in the space formed by the frame structure 110 and the rear cover 120. In an embodiment, the display 160 may form the majority portion of the front surface of the electronic device 101, and may be exposed to the outside through the front surface. The display 160 may output visual content. In an embodiment, the shape of the outer edge of the display 160 may be substantially similar to the shape of the outer edge of the side surface (or the frame structure 110) of the electronic device 101.

In an embodiment, the display 160 may include a plurality of layers. The plurality of layers may include a window. The window may be made of a substantially transparent material, and may be disposed on the outermost layer of the plurality of layers to form the front surface of the electronic device 101.

In an embodiment, the window may be formed with a glass plate. In this case, the window may include a polymeric material. In another embodiment, the window may be formed with a flexible material. In this case, the flexible window may include a polyimide (PI) window, and its strength may be lower than that of the glass plate window, due to its flexibility.

In an embodiment, light emitted from the display 160 may be provided to the outside through the window. In an embodiment, the shape of the edge of the display region of the display 160 and the shape of the edge of the window may be substantially the same. In an embodiment, a gap between the outer edge of the display region and the outer edge of the window may be substantially uniformly all around the display region of the display 160.

In an embodiment, the display 160 may be coupled with or may be disposed adjacent to a touch sensing circuit, a pressure sensor to measure an intensity (pressure) of a touch, and/or a digitizer to detect a stylus pen of a magnetic field method.

In an embodiment, the display 160 may include an opening formed on a certain region thereof. However, in this case, the opening may not be formed on the window of the plurality of layers included in the display 160. A camera module 181 may be disposed in the opening. The camera module 181 may have at least a portion inserted into the opening so that at least its lens element is exposed through the front surface of the electronic device 101. The camera module 181 may acquire pictures and videos through the opening.

In an embodiment, a fingerprint sensor 150 may be disposed on a rear surface of the display 160. At least one layer of the plurality of layers of the display 160 may include an opening (for example, an opening 161 of FIG. 2) corresponding to the fingerprint sensor 150. The fingerprint sensor 150 may acquire information regarding user's fingerprints through the opening.

In an embodiment, various components (for example, a proximity sensor, an illuminance sensor) (not shown) may be disposed on the rear surface of the display 160.

In an embodiment, an audio module 114 may include a microphone hole and a speaker hole. The microphone hole may have a microphone disposed therein to acquire an external sound, and in a certain embodiment, a plurality of microphones may be disposed to detect a direction of a sound. The speaker hole may include an external speaker hole and a call receiver hole. In a certain embodiment, the speaker hole and the microphone hole may be implemented as one hole.

In an embodiment, a key input device 117 may be disposed on the side surface of the electronic device 101. The key input device 117 may have a portion inserted into an opening formed on the frame structure 110, and may have the other portion protruding from the frame structure 110. In an embodiment, the key input device 117 may include a volume control button, a power button, an artificial intelligence (AI) call button, but is not limited thereto. In another embodiment, the key input device 117 may be implemented on the display 160 in other forms like a soft key.

In an embodiment, a connector hole 108 may be coupled with the frame structure 110, and may be disposed on the side surface of the electronic device 101. The connector hole 108 may accommodate a connector (or a receptacle) to transmit and receive power and/or data to and from an external electronic device. For example, the connector hole 108 may accommodate a USB type-c receptacle.

The electronic device 101 may further include a sensor module (not shown), for example, at least one of a gesture sensor, a gyro sensor, an atmospheric pressure sensor, a magnetic sensor, an acceleration sensor, a grip sensor, a color sensor, an infrared (IR) sensor, a biometric sensor, a temperature sensor, a humidity sensor, and/or an illuminance sensor.

Figure 2:
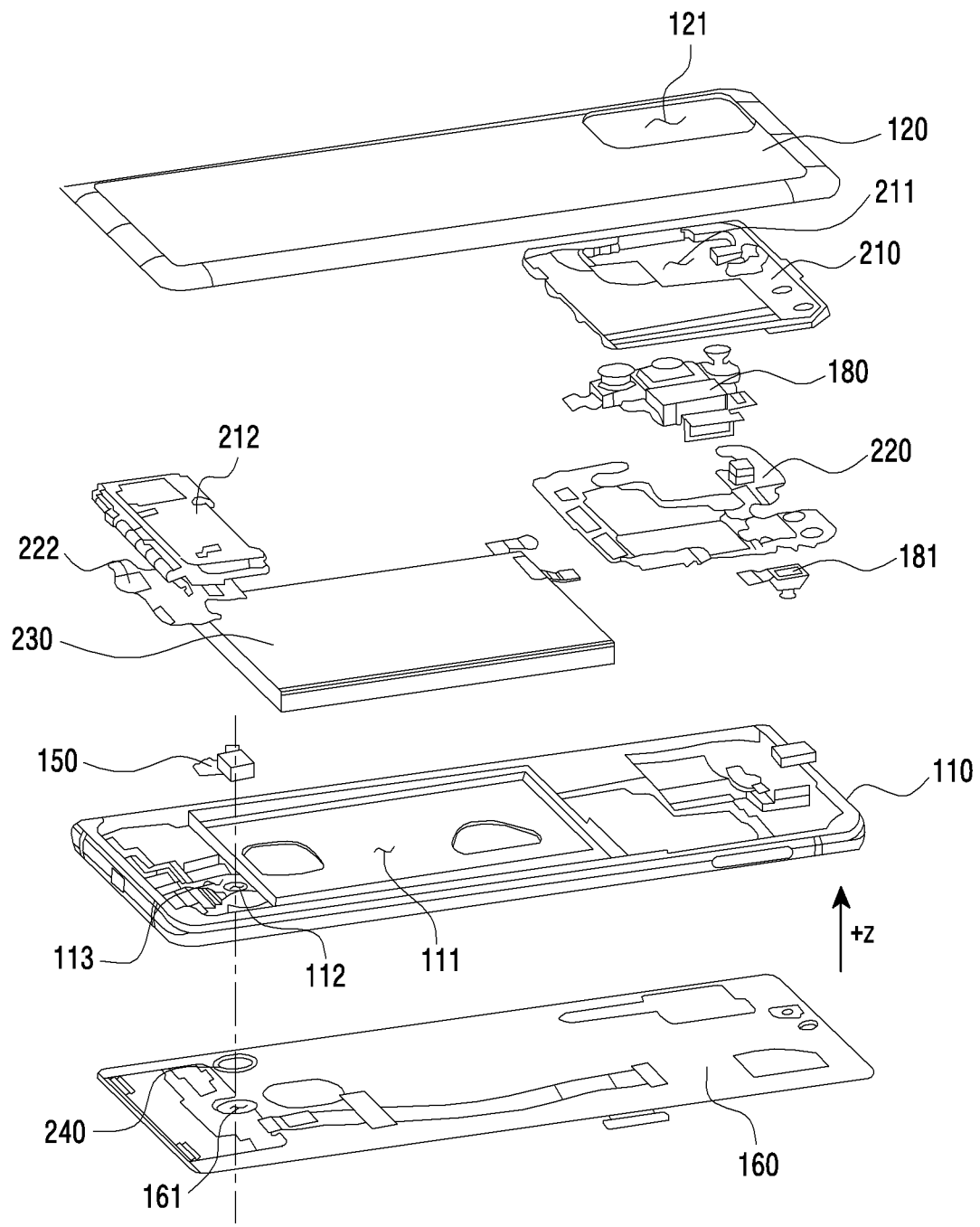
FIG. 2 is an exploded perspective view of the electronic device according to an embodiment.

FIG. 2 is an exploded perspective view of the electronic device 101 according to an embodiment.

Referring to FIG. 2, the electronic device 101 according to an embodiment may include a first support member 210, a second support member 212, a first printed circuit board (PCB) 220, a second PCB 222, a battery 230, and a dustproof member 240. Redundant explanation of the same components as in FIG. 1 will be omitted for FIG. 2. At least one component (for example, the camera module 180) of the components of the electronic device illustrated in FIG. 2 according to an embodiment may be omitted.

In an embodiment, the first support member 210 may be disposed under the rear cover 120 (for example, −z direction). In an embodiment, the first support member 210 may support the camera module 180 and the first PCB 220. In an embodiment, the first support member 210 may include an opening 211 corresponding to the camera module 180. The camera module 180 may have at least a portion inserted into the opening 211 of the first support member 210 and an opening 121 of the rear cover 120 so that it is exposed to the outside.

In an embodiment, the second support member 212 may be disposed under the rear cover 120 (for example, −z direction). In an embodiment, the second support member 212 may support the second PCB 222.

In an embodiment, the frame structure 110 may be disposed between the rear cover 120 and the display 160. The frame structure 110 may include a region 111 on which the battery 230 is seated, and a region 113 on which the fingerprint sensor 150 is seated. The frame structure 110 may include a fourth opening 112 formed on at least a portion of the region 113 on which the fingerprint sensor 150 is seated. The fingerprint sensor 150 may acquire information on fingerprints through the fourth opening 112.

In an embodiment, the battery 230 may be disposed between the rear cover 120 and the frame structure 110. The battery 230 may have at least a portion accommodated in the region 111 formed by the frame structure 110. In an embodiment, a volume of the region 111 where the battery 230 is disposed may be substantially similar to a volume of the battery 230. For example, the region 111 may have a volume larger than or equal to the volume of the battery 230, so that changes (for example, swelling) in the volume caused by use of the battery 230 can be accommodated.

In an embodiment, the first PCB 220 may be disposed between the first support member 210 and the frame structure 110. The first PCB 220 may be supported by the first support member 210 and the frame structure 110.

In an embodiment, the second PCB 222 may be disposed between the second support member 212 and the frame structure 110. The second PCB 222 may be supported by the second support member 212 and the frame structure 110. In an embodiment, the second PCB 222 may be electrically connected with the first PCB 220. For example, the second PCB 222 may be electrically connected with the first PCB 220 by a connection member (for example, a cable, an FPCB) (not shown) to transmit and receive signals and/or data to and from the first PCB 220.

In an embodiment, the first PCB 220 and the second PCB 222 may have various components (for example, a processor 1020, a memory 1030 of FIG. 10) of the electronic device 101 disposed thereon.

In an embodiment, the fingerprint sensor 150 may be disposed between the frame structure 110 and the second support member 212. In an embodiment, the fingerprint sensor 150 may have at least a portion accommodated in the region 113 formed on the frame structure 110 to be disposed over the frame structure 110 (for example, +z direction). In an embodiment, the fingerprint sensor 150 may be disposed to face the display 160 (for example, the display is disposed in the −z direction relative to the fingerprint sensor 150) to acquire fingerprint information of a finger contacting the display 160. In an embodiment, the fingerprint sensor 150 may acquire user's fingerprint information through the fourth opening 112 formed on at least a portion of the region 113.

In an embodiment, the fingerprint sensor 150 may be electrically connected with the second PCB 222.

In an embodiment, the dustproof member 240 may be disposed between the frame structure 110 and the display 160. The dustproof member 240 may be in close contact with the frame structure 110 and the display 160 and may be coupled to the frame structure 110 and the display 160. In an embodiment, the dustproof member 240 may have a ring shape having an outer diameter and an inner diameter. In an embodiment, the dustproof member 240 may be made of a sponge and/or rubber.

Figure 3:
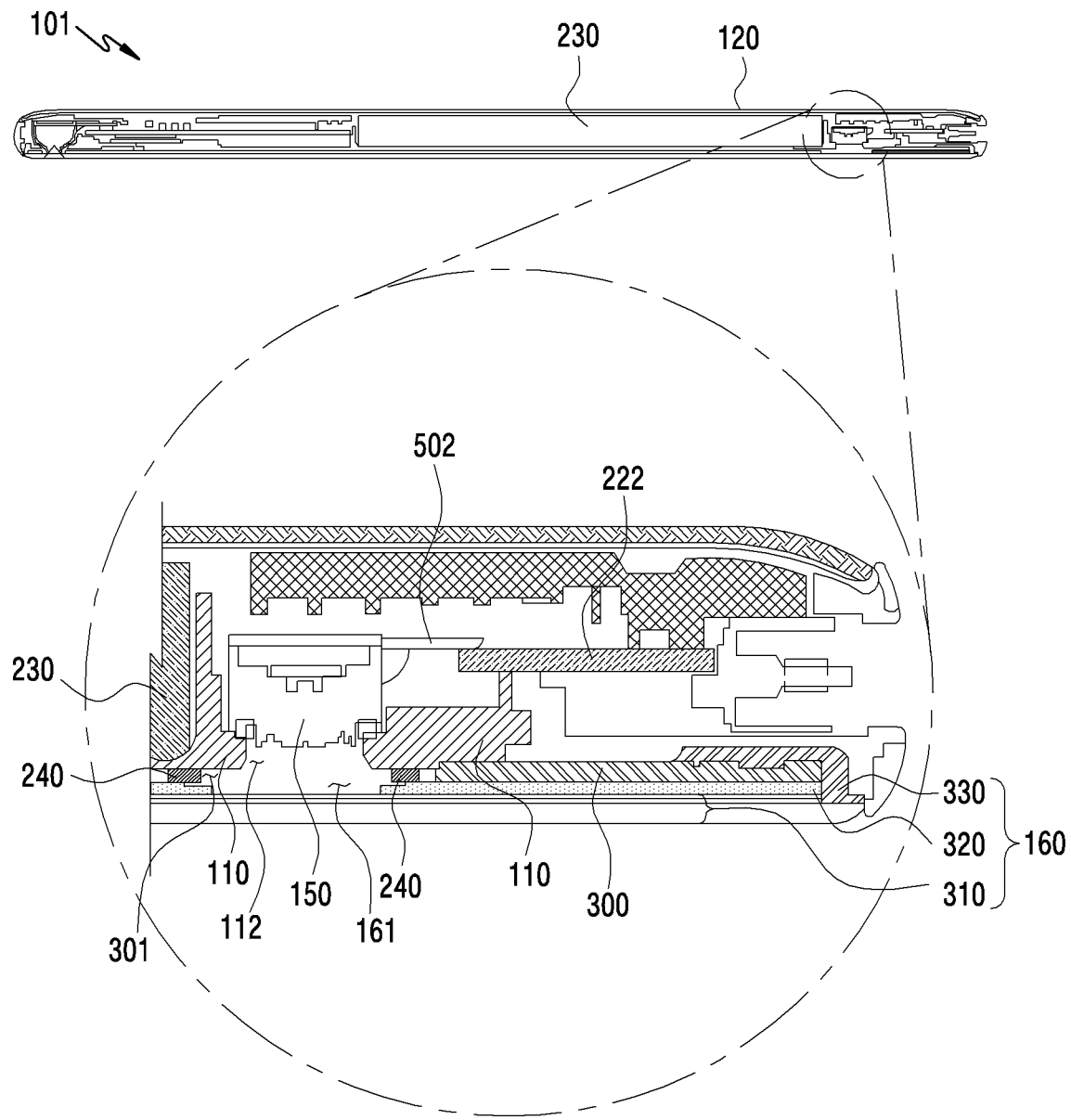
FIG. 3 is a cross-sectional view of the electronic device, viewed from A-A' of FIG. 1.

FIG. 3 is a cross-sectional view of the electronic device 101, viewed from A-A' of FIG. 1.

Referring to FIG. 3, the fingerprint sensor 150 may be disposed between the second support member 212 and the frame structure 110. The fingerprint sensor 150 may be disposed over the frame structure 110 (for example, the +z direction) and is coupled with the frame structure 110. In an embodiment, the fingerprint sensor 150 may be electrically connected with the second PCB 222 through a wire member 502. Fingerprint information acquired by the fingerprint sensor 150 may be provided to the processor 1020 through the second PCB 222.

In an embodiment, the display 160 may include a front panel 310, a rear panel 320, and a wire member 330. In an embodiment, the front panel 310 may include pixels that output light (i.e. visual content) to the user. In an embodiment, the rear panel 320 may be disposed over the front panel 310 (for example, in the +z direction) to protect the front panel 310. In an embodiment, each of the front panel 310 and the rear panel 320 may include a plurality of layers.

In an embodiment, the wire member 330 may be coupled to one end of the front panel 310, and may be bent over the rear panel 320 (for example, in the +z direction) from the one end, and may be extended toward the inside of the electronic device 101. In an embodiment, one end of the wire member 330 may be coupled with the front panel 310 and the other end may be coupled with an FPCB 300. Signals and data for providing visual information to the user may be transmitted to the display 160 through the FPCB 300 and the wire member 330.

In an embodiment, the dustproof member 240 may be disposed between the frame structure 110 and the rear panel 320. In an embodiment, the dustproof member 240 may be in contact with the frame structure 110 and the rear panel 320. In an embodiment, the dustproof member 240 may be pressed or pushed by the frame structure 110 and the rear panel 320.

In an embodiment, the outer diameter of the dustproof member 240 may be smaller than the diameter of a third opening 301 formed on the FPCB 300, such that the dustproof member 240 may be disposed inside the third opening 301 of the FPCB 300. For example, the outer diameter of the dustproof member 240 may be smaller than the diameter of the third opening 301. In an embodiment, the dustproof member 240 may be spaced apart from the FPCB 300. In an embodiment, the dustproof member 240 may have at least a portion accommodated in the third opening 301 formed on the FPCB 300, and the dustproof member 240 may be disposed between the frame structure 110 and the rear panel 320.

In an embodiment, the inner diameter of the dustproof member 240 may be larger than the diameter of the fourth opening 112 formed on the frame structure 110. The dustproof member 240 may be disposed to surround the fourth opening 112.

In an embodiment, without the dustproof member 240, foreign substances may pass between the display 160 and the frame structure 110 and may enter the fingerprint sensor 150 through the fourth opening 112 of the frame structure 110. Since the dustproof member 240 surrounds the fourth opening 112 and blocks the path between the frame structure 110 and the display 160, through which foreign substances may enter, the dustproof member 240 can prevent foreign substances from entering the fingerprint sensor 150.

The terms "front panel" 310 and "rear panel" 320 used in the disclosure are used to distinguish the front panel 310 and the rear panel 320, and are not intended to limit functions, structures, etc. of the front panel 310 and the rear panel 320. In an embodiment, the front panel 310 may be referred to as a first panel 310 and the rear panel 320 may be referred to as a second panel 320.

Figure 4:
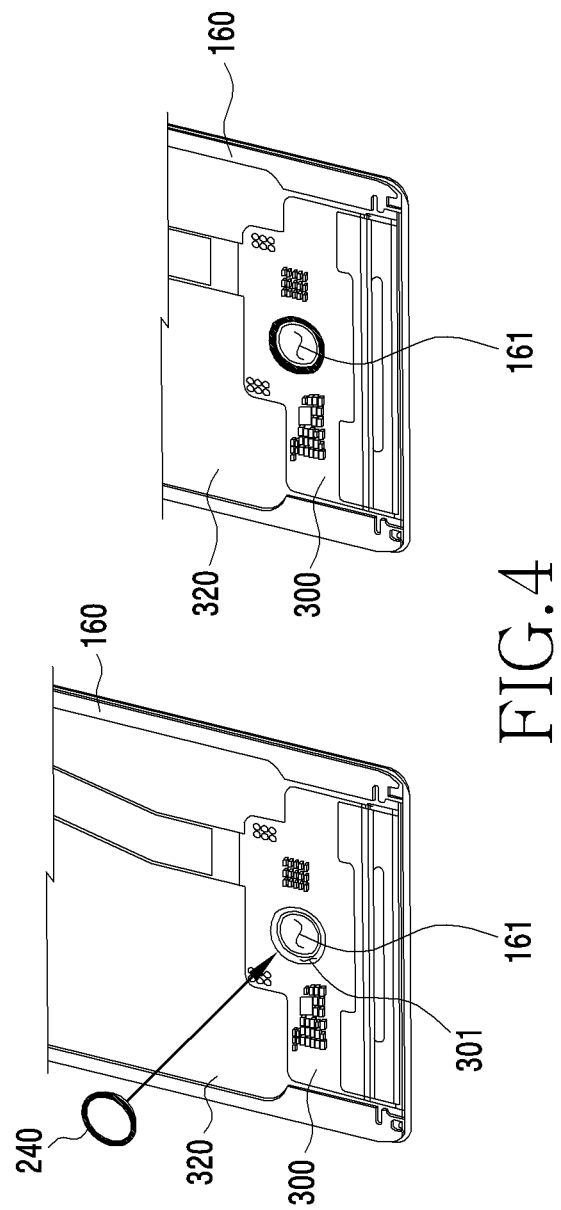
FIG. 4 is a view illustrating a structure in which a dustproof member is attached to a display according to an embodiment.

FIG. 4 is a view illustrating a structure in which the dustproof member 240 is attached to the display 160 according to an embodiment.

Referring to FIG. 4, the dustproof member 240 according to an embodiment may be disposed to be in contact with the display 160. In an embodiment, since the outer diameter of the dustproof member 240 is smaller than the diameter of the third opening 301 formed on the FPCB 300, at least a portion of the dustproof member 240 may be accommodated and disposed in the third opening 301 formed on the FPCB 300. That is, the circumference of the third opening 301 formed on the FPCB 300 may surround the outer circumference of the dustproof member 240.

In an embodiment, since the inner diameter of the dustproof member 240 is larger than the opening 161 of the display 160, the dustproof member 240 may be disposed to surround the opening 161.

In an embodiment, the shape of the dustproof member 240 may be an annular shape. The shape of the outer edge of the dustproof member 240 may be substantially similar to the third opening 301 and the opening 161.

Figure 5:
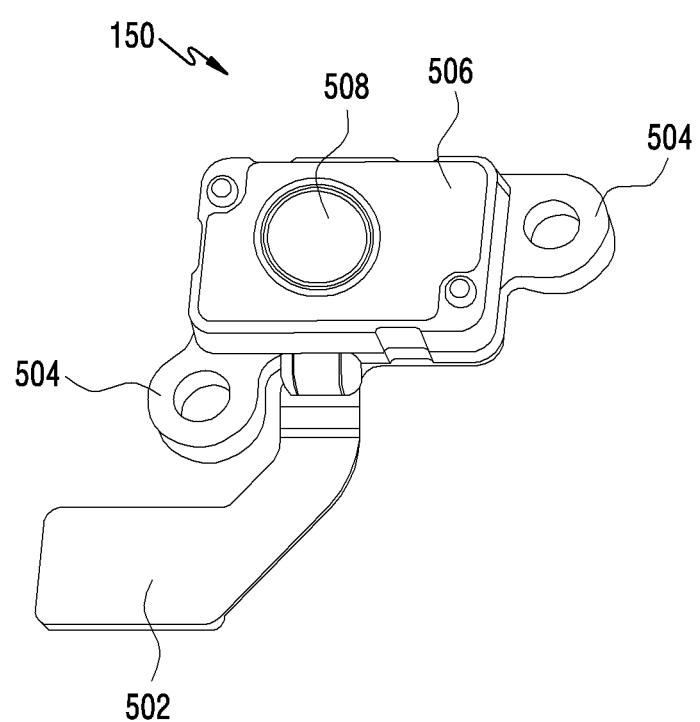
FIG. 5 is a view illustrating a fingerprint sensor according to an embodiment.

FIG. 5 illustrates the fingerprint sensor 150 according to an embodiment.

Referring to FIG. 5, the fingerprint sensor 150 according to an embodiment may include a sensor unit 508, a wire member 502, a fixing member 504, and an elastic member 506. In an embodiment, the fingerprint sensor 150 may include a capacitive fingerprint sensor, an optical fingerprint sensor, and an ultrasonic fingerprint sensor. However, this should not be considered as limiting.

In an embodiment, the sensor unit 508 may acquire information on user's fingerprints.

In an embodiment, when the fingerprint sensor 150 is a capacitive fingerprint sensor, the sensor unit 508 may detect a difference in capacitance which changes according to the height difference between ridges and valleys of a fingerprint (the distance difference between the fingerprint sensor and the fingerprint), and may generate a value regarding the fingerprint information based on the detection.

In an embodiment, when the fingerprint sensor 150 is an ultrasonic fingerprint sensor, the sensor unit 508 may acquire information regarding user's fingerprints based on the time during which ultrasonic waves are transmitted to and reflected from the ridges and valleys of a fingerprint.

In an embodiment, when the fingerprint sensor 150 is an optical fingerprint sensor, the sensor unit 508 may include a light emitter and a light receiver. The light emitter may emit light toward user's fingerprints, and the light receiver may acquire light reflected from the user's fingerprints. In an embodiment, the sensor unit 508 may acquire data regarding the fingerprints based on light reflected from the user's finger. In an embodiment, all of the light emitter and the light receiver included in the sensor unit 508 may be included in the fingerprint sensor 150, or any one of the light emitter and the light receiver may be separated from the fingerprint sensor 150 and may be separately disposed.

In an embodiment, the wire member 502 may transmit fingerprint information acquired by the sensor unit 508 to another component, or may provide signals or data transmitted from another component to the fingerprint sensor 150. For example, the wire member 502 may be coupled to the second PCB 222 to provide fingerprint information to the second PCB 222 or to transmit signals or data provided from the second PCB to the fingerprint sensor 150.

In an embodiment, the fixing member 504 may fix the fingerprint sensor 150 to the frame structure 110. The fixing member 504 may include an opening penetrating through the fixing member 504. The fingerprint sensor 150 may be coupled and fixed to the frame structure 110 by means of a coupling member inserted into the opening. The above-described coupling member may include a bolt, a screw, but is not limited thereto.

In an embodiment, the elastic member 506 may be disposed to surround the sensor unit 508. The elastic member 506 may provide elasticity to prevent the fingerprint sensor 150 from being physically damaged even when the fingerprint sensor 150 is tightly coupled to the frame structure 110.

Figure 6:
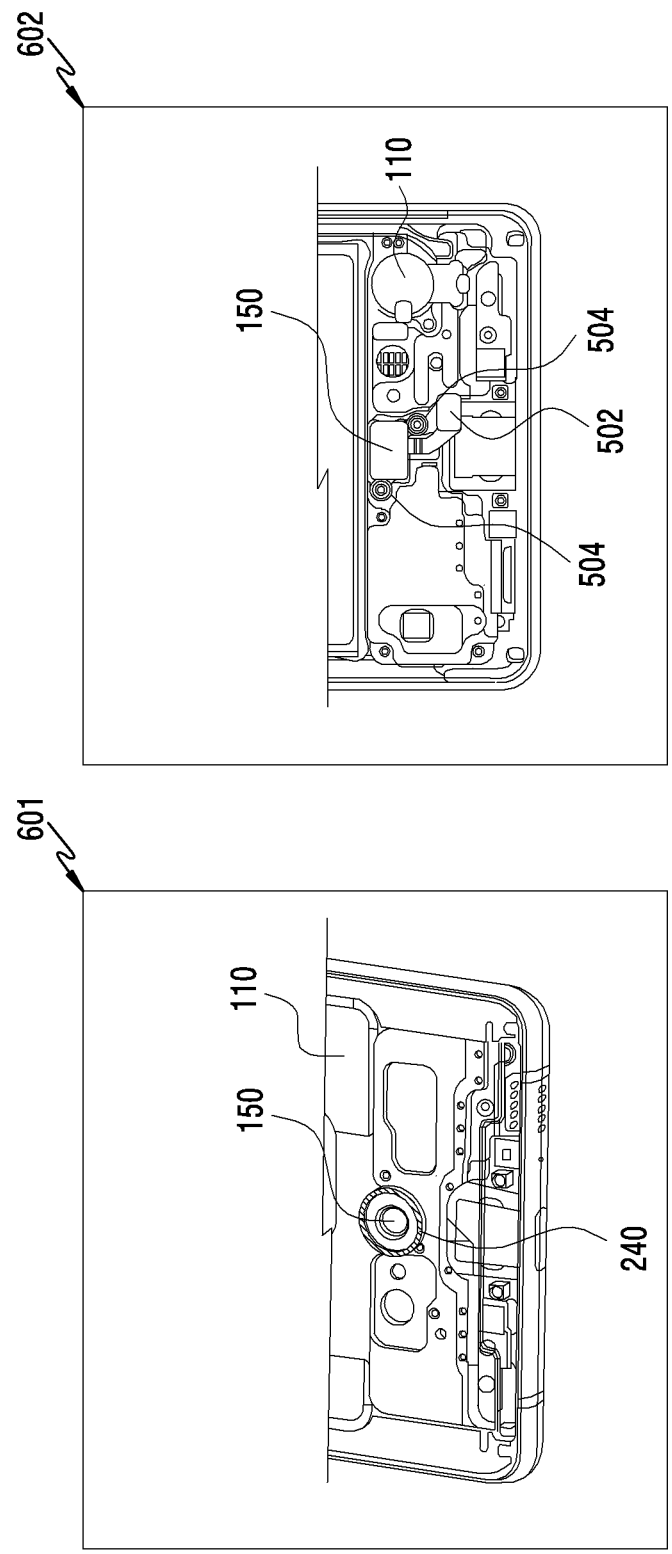
FIG. 6 is a view illustrating the dustproof member and the fingerprint sensor which are coupled to a frame structure according to an embodiment.

FIG. 6 illustrates the dustproof member 240 and the fingerprint sensor 150 which are coupled to the frame structure 110 according to an embodiment.

Referring to FIG. 6, reference numeral 601 illustrates the frame structure 110 of FIG. 2 when viewed in the +z direction, and reference numeral 602 illustrates the frame structure 110 of FIG. 2 when viewed in the −z direction.

Referring to reference numeral 601, at least a portion of the fingerprint sensor 150 may be seen through the fourth opening 112 of the frame structure 110. For example, the sensor unit 508 of the fingerprint sensor 150 may be exposed through the fourth opening 112. The fourth opening 112 may be formed to correspond to the sensor unit 508 of the fingerprint sensor 150. The dustproof member 240 surrounding the fourth opening 112 may be disposed in contact with the frame structure 110. In an embodiment, the fingerprint sensor 150 may be disposed to have the sensor unit 508 face the display 160 to acquire fingerprint information of the user's finger contacting the display 160.

Referring to reference numeral 602, the fingerprint sensor 150 may be coupled to the frame structure 110 by means of the fixing member 504. The frame structure 110 may form a seating space (for example, the region 113 of FIG. 2) corresponding to the shape of the fingerprint sensor 150, and at least a portion of the fingerprint sensor 150 may be accommodated in the seating space.

Figure 7:
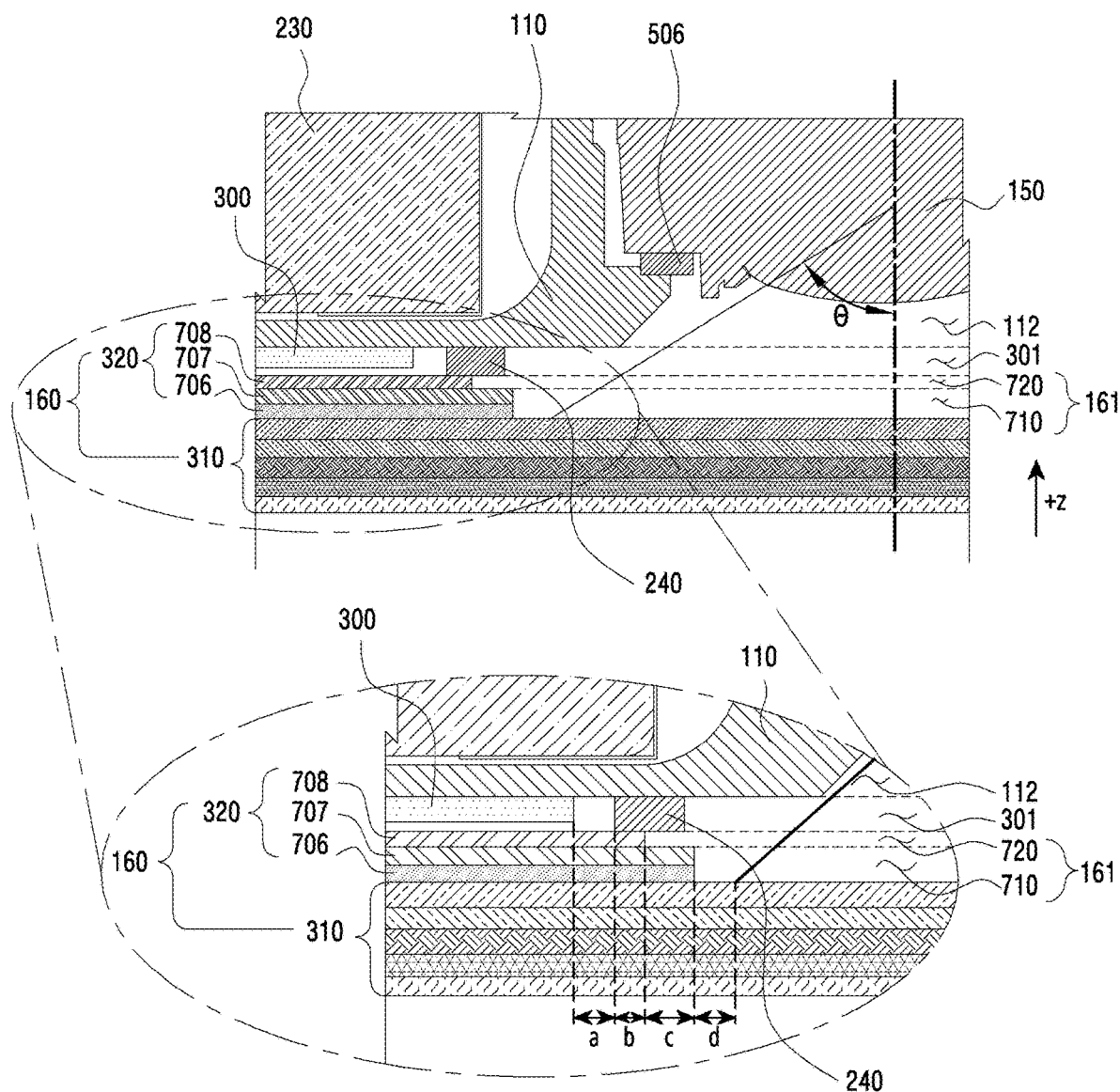
FIG. 7 is a cross-sectional view of the electronic device according to an embodiment.

FIG. 7 is a cross-sectional view of the electronic device 101 according to an embodiment.

FIG. 7 is a partial cross-sectional view of the electronic device 101 of FIG. 1, viewed A-A'.

In an embodiment, the display 160 may include the front panel 310 and the rear panel 320.

The front panel 310 according to an embodiment may include a plurality of layers. For example, the front panel 310 may include a window forming the front surface of the electronic device 101, a polarizing layer, an adhesive layer bonding the window and the polarizing layer, a light emitting layer including a plurality of pixels, and a base layer serving as a substrate for the above-described layers.

The rear panel 320 according to an embodiment may include an adhesive layer 706, a cushion layer 707, and a conductive layer 708.

In an embodiment, the adhesive layer 706 may be attached to the front panel 310 of the display 160. The adhesive layer 706 may include an embossed pattern. For example, the adhesive layer 706 may include a plurality of protrusions and a plurality of recesses formed by the plurality of protrusions. The adhesive layer 706 having the embossed pattern can prevent foreign substances, such as moisture or dust, from entering the inside of the display 160.

In an embodiment, the cushion layer 707 may be disposed over the adhesive layer 706 (for example, the +z direction). The cushion layer 707 may mitigate impacts applied to the display 160, thereby enhancing durability of the display 160. The cushion layer 707 may be made with a sponge.

In an embodiment, the FPCB 300 may be disposed between the frame structure 110 and the conductive layer 708. The FPCB 300 may be spaced apart from the conductive layer 708 as shown in FIG. 7, or the FPCB 300 may be in contact with the conductive layer 708, differently from the illustration of FIG. 7 (for example, as shown in FIG. 3). When the FPCB 300 is in contact with the conductive layer 708, an adhesive member (for example, an adhesive tape or an adhesive) may be interposed between the FPCB 300 and the conductive layer 708.

In an embodiment, the adhesive layer 706 and the cushion layer 707 may include a first opening 710 corresponding to the fingerprint sensor 150. For example, at least a portion of the first opening 710 may overlap the fingerprint sensor 150. In an embodiment, the first opening 710 may be formed to be larger than a region of the display 160 corresponding to the angle of view of the fingerprint sensor 150. That is, the adhesive layer 706 and the cushion layer 707 may be spaced apart from the region of the angle of view of the fingerprint sensor 150 by a distance d. The first opening 710 may be formed to be larger than the region corresponding to the angel of view 20 of the fingerprint sensor 150 by the distance d. When the adhesive layer 706 or the cushion layer 707 are disposed within the region corresponding to the angle of view of the fingerprint sensor 150, it may be difficult for the fingerprint sensor 150 to acquire fingerprint information. For example, light emitted from the fingerprint sensor 150 may be refracted or reflected by the adhesive layer 706 and/or the cushion layer 707, and in this case, the ratio between the amount of light arriving at the user's finger contacting the display 160 and the amount of light emitted by the fingerprint sensor 150 may be reduced. In another example, light reflected from the user's finger and passing through the display 160 may be refracted or reflected by the adhesive layer 706 and/or the cushion layer 707, and in this case, the ratio between the amount of light provided to the fingerprint sensor 150 and the amount of light reflected from the user's finger may be reduced. In another embodiment, the first opening 710 may have substantially the same area as the region corresponding to the angle of view of the fingerprint sensor 150. However, even in this case, the adhesive layer 706 and the cushion layer 707 may not be disposed within the region corresponding to the angle of view. In an embodiment, the line x may be a segment passing through the center of the sensor unit (for example, the sensor unit 508 of FIG. 5) of the fingerprint sensor 150. In an embodiment, the angle of view 20 of the fingerprint sensor 150 may be 95° to 135° inclusive.

In an embodiment, the conductive layer 708 may be disposed over the cushion layer 707 (for example, the +z direction). The conductive layer 708 may block or shield electromagnetic waves to prevent other components of the electronic device 101 from being influenced by electromagnetic waves generated in the display 160 or to prevent the display 160 from being influenced by electromagnetic waves generated in other components. In an embodiment, the conductive layer 708 may include copper.

In an embodiment, the conductive layer 708 may include a second opening 720 formed on a region corresponding to the fingerprint sensor 150. The diameter of the second opening 720 may be larger than that of the first opening 710. In an embodiment, since the conductive layer 708 includes metal such as copper, diffuse reflection of light passing through the display 160 may be generated due to the conductive layer 708. As the conductive layer 708 is closer to the fingerprint sensor 150, the degree of diffuse reflection of light (or the degree of diffuse-reflected light arriving at the fingerprint sensor 150) may increase, and accordingly, the fingerprint sensor 150 may malfunction. In an embodiment, the conductive layer 708 may be spaced apart from the adhesive layer 706 and the cushion layer 707 by a distance c. That is, the diameter of the second opening 720 formed on the conductive layer 708 may be larger than the diameter of the first opening 710 formed on the adhesive layer 706 and the cushion layer 707 by a length 2c.

In an embodiment, the dustproof member 240 may be disposed in the third opening 301 formed on the FPCB 300. In an embodiment, the dustproof member 240 may be in contact with the conductive layer 708. The dustproof member 240 shown in FIG. 7 may be spaced apart from the cushion layer 707, but the dustproof member 240 having elasticity may be pressed through the operation of coupling the display 160 and the frame structure 110 and may come into contact with the cushion layer 707. In this case, the dustproof member 240 may surround the circumference of the second opening 720 formed on the conductive layer 708. In an embodiment, diffuse reflection of light caused by the conductive layer 708 can be prevented by the dustproof member 240 surrounding the conductive layer 708, and malfunction of the fingerprint sensor 150 can be prevented.

In an embodiment, a portion of the dustproof member 240 may overlap a portion of the conductive layer 708. For example, the dustproof member 240 may be disposed to overlap the conductive layer 708 as much as b. In an embodiment, the dustproof member 240 overlaps the conductive layer 708 in contact therewith, such that a path through which foreign substances may enter can be blocked. In an embodiment, as an area where the dustproof member 240 and the conductive layer overlap each other increases, the effect of preventing foreign substances from entering can be enhanced.

In an embodiment, the dustproof member 240 may be spaced apart from the FPCB 300. In an embodiment, the outer diameter of the dustproof member 240 may be smaller than the diameter of the third opening 301 of the FPCB 300. That is, the outer diameter of the dustproof member 240 may be smaller than the diameter of the third opening 301 of the FPCB 300 by 2a. The outer diameter of the dustproof member 240 and the diameter of the third opening 301 may be different, considering the tolerances generated when the display 160, the frame structure 110, and the dustproof member 240 when they are assembled with one another.

The fingerprint sensor 150 according to an embodiment may acquire fingerprint information of a user through the first opening 710, the second opening 720, the third opening 301, and the fourth opening 112.

Figure 8:
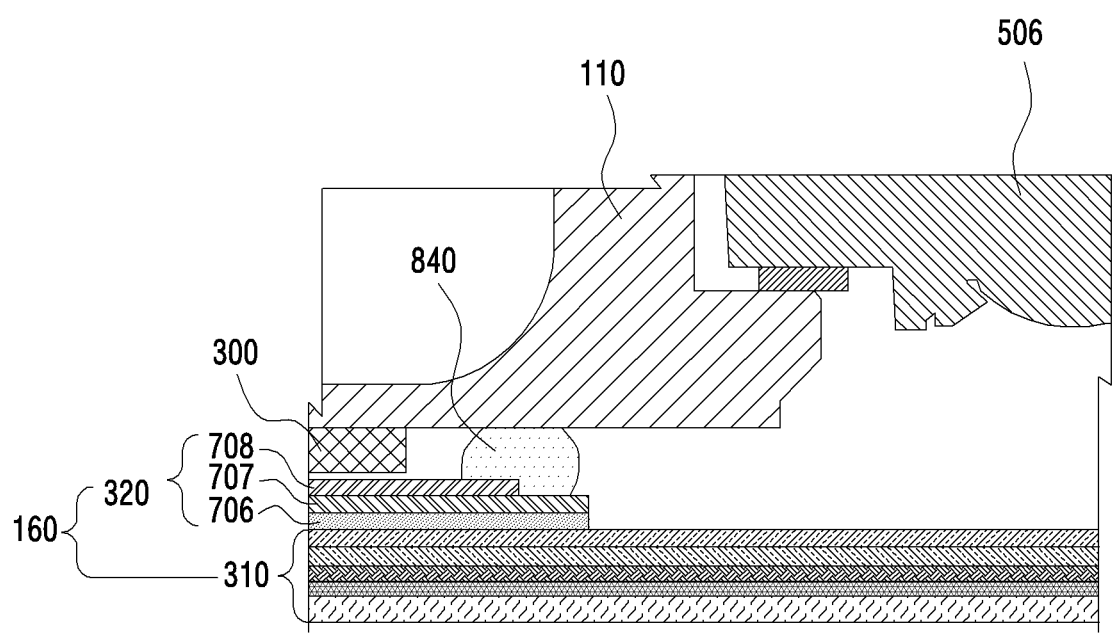
FIG. 8 is a cross-sectional view of the electronic device according to another embodiment.

FIG. 8 is a cross-sectional view of the electronic device 101 according to another embodiment.

Referring to FIG. 8, the electronic device 101 according to another embodiment may include a dustproof member 840.

In an embodiment, the dustproof member 840 may be coated and disposed between the frame structure 110 and the rear panel 320. The dustproof member 840 may include an opaque resin.

In an embodiment, the dustproof member 840 may be coated over the frame structure 110 to have a higher height than the FPCB 300. In an embodiment, the dustproof member 840 may be coated over a region corresponding to the circumference of the second opening 720. The coated dustproof member 840 may be pushed through an operation of coupling the display 160. When the dustproof member 840 is pushed, the dustproof member 840 may surround an entire edge region of the second opening 720 of the conductive layer 708.

Figure 9:
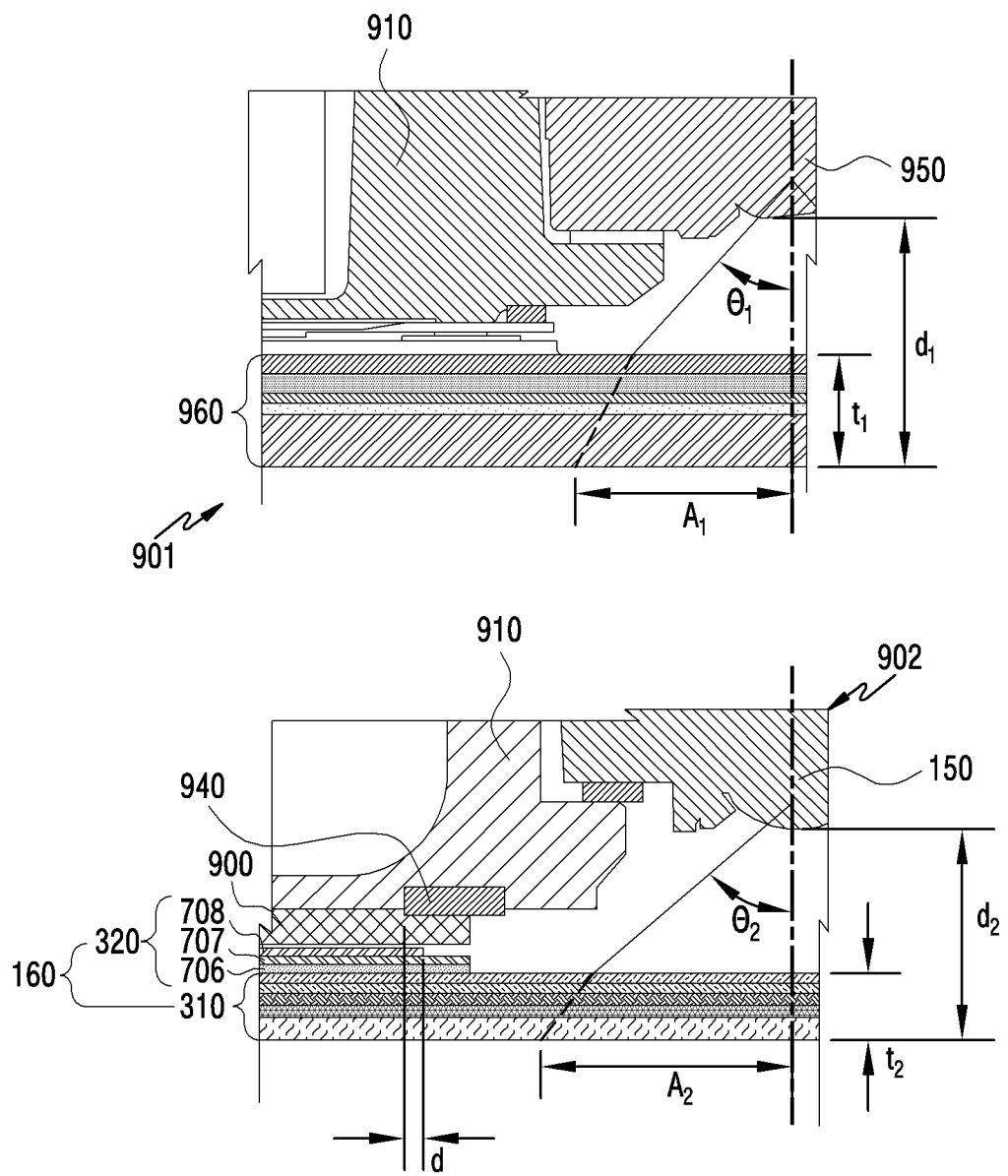
FIG. 9 is a cross-sectional view of two electronic devices of reference embodiments that may be compared to the electronic devices disclose above.

FIG. 9 is a cross-sectional view of two electronic devices of reference embodiments that may be compared to the electronic devices disclose above.

Referring to reference numerals 901 and 902 of FIG. 9, the electronic devices according to two reference embodiments may include a display 960. The thickness of the display 960 may be $t_1$. As the thickness of the display 960 is reduced, the distance $d_1$ between a fingerprint sensor 950 and a region that a user's finger contacts may be reduced. For example, when the display 160 has a thickness $t_2$ which is smaller than $t_1$, the distance between the fingerprint sensor 150 and the finger contact region may be $d_2$ which is smaller than $d_1$. In this case, even when the fingerprint sensor 150 maintains the same angle of view $2\theta_1$ (for example, 105° to 110°), the width of the region where fingerprint information is acquired may be reduced. In an embodiment, as the thickness of the display is reduced, the angle of view $2\theta_1$ of the fingerprint sensor 150 should be increased in order to make it possible to acquire fingerprint information on the same display region. The display 160 of the electronic device 101 according to an embodiment may have the thickness $t_2$ thinner than the thickness $t_1$. The diameters of the first opening 710, the second opening 720, the third opening 301, and the fourth opening 112 of the electronic device 101 may be larger than diameters of openings of the electronic device shown in the reference embodiments of FIG. 9. The fingerprint sensor 150 of the electronic device 101 according to an embodiment may have an angle of view of 95° to 135° which is larger than the angle of view $2\theta_1$ of the conventional fingerprint sensor. Even when the electronic device 101 according to an embodiment includes the display 160 which is thinner than the conventional display, the electronic device 101 may acquire fingerprint information regarding the same or larger area, based on the increased angle of view. For example, the electronic device according to the reference embodiment may acquire fingerprint information regarding an area $A_1$ corresponding to $\theta_1$, whereas the electronic device 101 according to an embodiment may acquire fingerprint information regarding an area $A_2$ corresponding to $\theta_2$ larger than $\theta_1$. In an embodiment, the area $A_2$ may be substantially the same as the area $A_1$ or larger than $A_1$.

Referring to reference numeral 902, the electronic device according to a reference embodiment may include a dustproof member 940 which is compared with the dustproof member 240 and the dustproof member 840. The dustproof member 940 may have at least a portion accommodated in a processed region of a frame structure 910. The dustproof member 940 may be disposed between the frame structure 910 and an FPCB 900. In this case, the dustproof member 940 may overlap the conductive layer 708 by as much as d. Since the distance d by which the dustproof member 940 of this embodiment overlaps the conductive layer 708 is smaller than the distance b by which the dustproof member 240 of the embodiment of the disclosure illustrated in FIG. 7 overlaps the conductive layer 708, the electronic device 101 according to the embodiment shown in FIG. 7 can prevent foreign substances from entering the fingerprint sensor 150 more effectively than the electronic device of shown in 902.

The electronic device according to the reference embodiment may increase the degree by which the dustproof member 940 and the conductive layer 708 overlap by further processing the frame structure 910. However, in this case, perforations may be formed on the frame structure 910, which may cause the frame structure 910 to be easily damaged.

Since the conductive layer 708 of the electronic device according to the reference embodiment is not in contact with the dustproof member 940 or is not surrounded by the dustproof member 940, light passing through the display 160 may be diffuse-reflected by the conductive layer 708, and the fingerprint sensor 150 may malfunction due to the diffuse-reflected light. Since the dustproof member 240 of the electronic device 101 according to an embodiment of the disclosure surrounds a certain region of the conductive layer 708 close to the fingerprint sensor 150, diffuse reflection of light caused by the conductive layer 708 can be prevented, and malfunction of the fingerprint sensor 150 caused by diffuse reflection of light can be prevented.

An electronic device according to an embodiment described above may include: a housing including a window facing in a first direction and a rear plate facing in a second direction opposite the first direction; a display disposed between the window and the rear plate, and having at least a portion seen through the window, the display including: a first layer having a first surface disposed on the window and a second surface that faces in the second direction; a second layer having a third surface disposed on the second surface of the first layer, a fourth surface that faces in the second direction, and a first opening; and a conductive layer having a fifth surface disposed on the fourth surface of the second layer, a sixth surface that faces in the second direction, and a second opening corresponding to the first opening; an FPCB extended from at least a portion of the display and disposed on a surface, of the display, that faces in the second direction, and having a third opening corresponding to the second opening; a frame structure on which the display and the FPCB are seated, and which is disposed between the FPCB and the rear plate and has a fourth opening corresponding to the third opening; a fingerprint sensor having at least a portion inserted into the fourth opening and facing in the first direction; and a dustproof member disposed between the display and the frame structure within the third opening.

In an embodiment, the dustproof member may be in contact with at least a portion of the conductive layer.

In an embodiment, the dustproof member may be spaced apart from the FPCB and may be disposed to surround the fourth opening.

In an embodiment, one surface of the dustproof member may be in contact with at least a portion of the conductive layer and at least a portion of the second layer, and another surface of the dustproof member may be in contact with the frame structure.

In an embodiment, a diameter of the second opening may be larger than a diameter of the first opening.

In an embodiment, a diameter of the third opening may be larger than diameters of the first opening and the second opening.

In an embodiment, the second layer may include an adhesive layer and a cushion layer disposed in the second direction of the adhesive layer, and the conductive layer may be disposed in the second direction of the cushion layer.

In an embodiment, the dustproof member may be disposed to cover an edge of the second opening.

In an embodiment, the first layer may include an adhesive layer disposed on a surface of the window in the second direction, a polarizing layer disposed in the second direction of the adhesive layer, and a pixel layer disposed in the second direction of the polarizing layer.

In an embodiment, the second layer may include an adhesive layer disposed on the second surface of the first layer that faces in the second direction.

In an embodiment, the fingerprint sensor may acquire fingerprint information of a user of the electronic device contacting the window in the first direction, through the first opening, the second opening, the third opening, and the fourth opening.

In an embodiment, the electronic device may further include a battery, and the battery may be disposed in a space formed by the frame structure.

In an embodiment, the fingerprint sensor may have an angel of view of a designated range, and an area of the first opening may be larger than an area of a region corresponding to the angle of view.

In an embodiment, the designated range may be 95° to 135° inclusive.

In an embodiment, the dustproof member may include a sponge, rubber, or a resin.

An electronic device according to an embodiment may include: a housing including a front cover window and a rear cover; a display panel disposed under the front cover window, and comprising a plurality of layers, at least one first layer of the plurality of layers forming a first opening and a second layer of the plurality of layers forming a second opening; an FPCB electrically connected with the display panel and disposed on a rear surface of the display panel, and comprising a third opening corresponding to the first opening; a fingerprint sensor; a frame structure disposed between the front cover window and the rear cover, and having the fingerprint sensor and the FPCB disposed therein, and comprising a fourth opening corresponding to the third opening; and a dustproof member disposed to surround the fingerprint sensor, and the fingerprint sensor may be disposed to face a front surface of the electronic device to acquire fingerprints of a user through a space formed by the first opening, the second opening, the third opening, and the fourth opening, the dustproof member may be disposed between the second layer and the frame structure within the third opening.

In an embodiment, the dustproof member may be in contact with the first layer and the second layer.

In an embodiment, the second layer may include metal.

In an embodiment a diameter of the first opening may be smaller than a diameter of the second opening, the diameter of the second opening may be smaller than a diameter of the third opening, the diameter of the third opening may be larger than a diameter of the fourth opening, and the diameter of the fourth opening may be smaller than the diameter of the first opening and the diameter of the second opening.

In an embodiment, the dustproof member may be disposed outside a region of the third opening that corresponds to the first opening.

Figure 10:
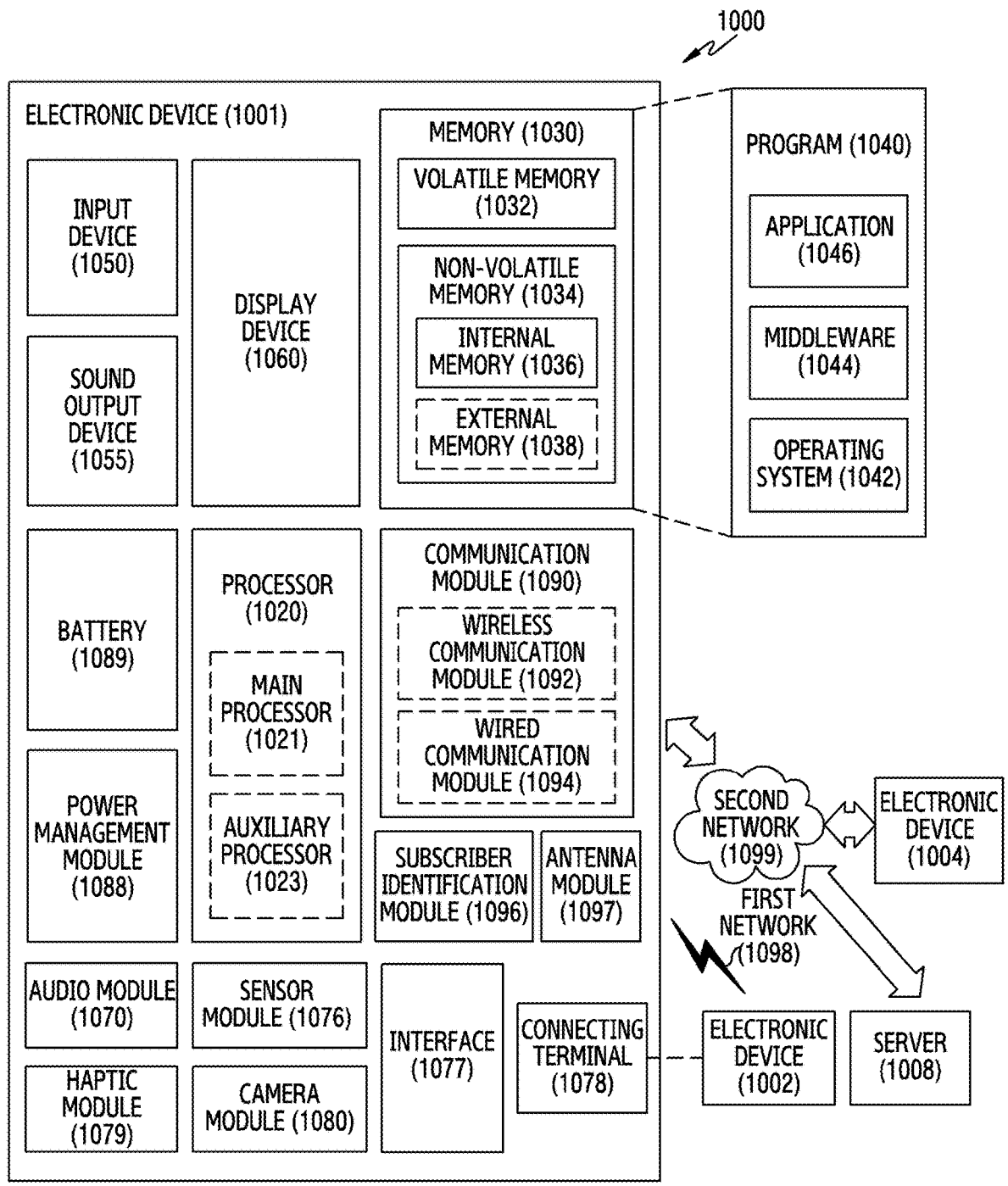
FIG. 10 is a block diagram of an electronic device in a network environment according to an embodiment.

FIG. 10 is a block diagram illustrating an electronic device 1001 in a network environment 1000 according to an embodiment. Referring to FIG. 10, the electronic device 1001 in the network environment 1000 may communicate with an electronic device 1002 via a first network 1098 (e.g., a short-range wireless communication network), or an electronic device 1004 or a server 1008 via a second network 1099 (e.g., a long-range wireless communication network). According to an embodiment, the electronic device 1001 may communicate with the electronic device 1004 via the server 1008. According to an embodiment, the electronic device 1001 may include a processor 1020, memory 1030, an input device 1050, a sound output device 1055, a display device 1060, an audio module 1070, a sensor module 1076, an interface 1077, a haptic module 1079, a camera module 1080, a power management module 1088, a battery 1089, a communication module 1090, a subscriber identification module (SIM) 1096, or an antenna module 1097. In some embodiments, at least one (e.g., the display device 1060 or the camera module 1080) of the components may be omitted from the electronic device 1001, or one or more other components may be added in the electronic device 1001. In some embodiments, some of the components may be implemented as single integrated circuitry. For example, the sensor module 1076 (e.g., a fingerprint sensor, an iris sensor, or an illuminance sensor) may be implemented as embedded in the display device 1060 (e.g., a display).

The processor 1020 may execute, for example, software (e.g., a program 1040) to control at least one other component (e.g., a hardware or software component) of the electronic device 1001 coupled with the processor 1020, and may perform various data processing or computation. According to one embodiment, as at least part of the data processing or computation, the processor 1020 may load a command or data received from another component (e.g., the sensor module 1076 or the communication module 1090) in volatile memory 1032, process the command or the data stored in the volatile memory 1032, and store resulting data in non-volatile memory 1034. According to an embodiment, the processor 1020 may include a main processor 1021 (e.g., a central processing unit (CPU) or an application processor (AP)), and an auxiliary processor 1023 (e.g., a graphics processing unit (GPU), an image signal processor (ISP), a sensor hub processor, or a communication processor (CP)) that is operable independently from, or in conjunction with, the main processor 1021. Additionally or alternatively, the auxiliary processor 1023 may be adapted to consume less power than the main processor 1021, or to be specific to a specified function. The auxiliary processor 1023 may be implemented as separate from, or as part of the main processor 1021.

The auxiliary processor 1023 may control at least some of functions or states related to at least one component (e.g., the display device 1060, the sensor module 1076, or the communication module 1090) among the components of the electronic device 1001, instead of the main processor 1021 while the main processor 1021 is in an inactive (e.g., sleep) state, or together with the main processor 1021 while the main processor 1021 is in an active state (e.g., executing an application). According to an embodiment, the auxiliary processor 1023 (e.g., an image signal processor or a communication processor) may be implemented as part of another component (e.g., the camera module 1080 or the communication module 1090) functionally related to the auxiliary processor 1023.

The memory 1030 may store various data used by at least one component (e.g., the processor 1020 or the sensor module 1076) of the electronic device 1001. The various data may include, for example, software (e.g., the program 1040) and input data or output data for a command related thereto. The memory 1030 may include the volatile memory 1032 or the non-volatile memory 1034.

The program 1040 may be stored in the memory 1030 as software, and may include, for example, an operating system (OS) 1042, middleware 1044, or an application 1046.

The input device 1050 may receive a command or data to be used by another component (e.g., the processor 1020) of the electronic device 1001, from the outside (e.g., a user) of the electronic device 1001. The input device 1050 may include, for example, a microphone, a mouse, a keyboard, or a digital pen (e.g., a stylus pen).

The sound output device 1055 may output sound signals to the outside of the electronic device 1001. The sound output device 1055 may include, for example, a speaker or a receiver. The speaker may be used for general purposes, such as playing multimedia or playing record, and the receiver may be used for an incoming call. According to an embodiment, the receiver may be implemented as separate from, or as part of the speaker.

The display device 1060 may visually provide information to the outside (e.g., a user) of the electronic device 1001. The display device 1060 may include, for example, a display, a hologram device, or a projector and control circuitry to control a corresponding one of the display, hologram device, and projector. According to an embodiment, the display device 1060 may include touch circuitry adapted to detect a touch, or sensor circuitry (e.g., a pressure sensor) adapted to measure the intensity of force incurred by the touch.

The audio module 1070 may convert a sound into an electrical signal and vice versa. According to an embodiment, the audio module 1070 may obtain the sound via the input device 1050, or output the sound via the sound output device 1055 or a headphone of an external electronic device (e.g., an electronic device 1002) directly (e.g., wiredly) or wirelessly coupled with the electronic device 1001.

The sensor module 1076 may detect an operational state (e.g., power or temperature) of the electronic device 1001 or an environmental state (e.g., a state of a user) external to the electronic device 1001, and then generate an electrical signal or data value corresponding to the detected state. According to an embodiment, the sensor module 1076 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 1077 may support one or more specified protocols to be used for the electronic device 1001 to be coupled with the external electronic device (e.g., the electronic device 1002) directly (e.g., wiredly) or wirelessly. According to an embodiment, the interface 1077 may include, for example, a high definition multimedia interface (HDMI), a universal serial bus (USB) interface, a secure digital (SD) card interface, or an audio interface.

A connecting terminal 1078 may include a connector via which the electronic device 1001 may be physically connected with the external electronic device (e.g., the electronic device 1002). According to an embodiment, the connecting terminal 1078 may include, for example, a HDMI connector, a USB connector, a SD card connector, or an audio connector (e.g., a headphone connector).

The haptic module 1079 may convert an electrical signal into a mechanical stimulus (e.g., a vibration or a movement) or electrical stimulus which may be recognized by a user via his tactile sensation or kinesthetic sensation. According to an embodiment, the haptic module 1079 may include, for example, a motor, a piezoelectric element, or an electric stimulator.

The camera module 1080 may capture a still image or moving images. According to an embodiment, the camera module 1080 may include one or more lenses, image sensors, image signal processors, or flashes.

The power management module 1088 may manage power supplied to the electronic device 1001. According to one embodiment, the power management module 1088 may be implemented as at least part of, for example, a power management integrated circuit (PMIC).

The battery 1089 may supply power to at least one component of the electronic device 1001. According to an embodiment, the battery 1089 may include, for example, a primary cell which is not rechargeable, a secondary cell which is rechargeable, or a fuel cell.

The communication module 1090 may support establishing a direct (e.g., wired) communication channel or a wireless communication channel between the electronic device 1001 and the external electronic device (e.g., the electronic device 1002, the electronic device 1004, or the server 1008) and performing communication via the established communication channel. The communication module 1090 may include one or more communication processors that are operable independently from the processor 1020 (e.g., the application processor (AP)) and supports a direct (e.g., wired) communication or a wireless communication. According to an embodiment, the communication module 1090 may include a wireless communication module 1092 (e.g., a cellular communication module, a short-range wireless communication module, or a global navigation satellite system (GNSS) communication module) or a wired communication module 1094 (e.g., a local area network (LAN) communication module or a power line communication (PLC) module). A corresponding one of these communication modules may communicate with the external electronic device via the first network 1098 (e.g., a short-range communication network, such as Bluetooth™, wireless-fidelity (Wi-Fi) direct, or infrared data association (IrDA)) or the second network 1099 (e.g., a long-range communication network, such as a cellular network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 1092 may identify and authenticate the electronic device 1001 in a communication network, such as the first network 1098 or the second network 1099, using subscriber information (e.g., international mobile subscriber identity (IMSI)) stored in the subscriber identification module 1096.

The antenna module 1097 may transmit or receive a signal or power to or from the outside (e.g., the external electronic device) of the electronic device 1001. According to an embodiment, the antenna module 1097 may include an antenna including a radiating element composed of a conductive material or a conductive pattern formed in or on a substrate (e.g., PCB). According to an embodiment, the antenna module 1097 may include a plurality of antennas. In such a case, at least one antenna appropriate for a communication scheme used in the communication network, such as the first network 1098 or the second network 1099, may be selected, for example, by the communication module 1090 (e.g., the wireless communication module 1092) from the plurality of antennas. The signal or the power may then be transmitted or received between the communication module 1090 and the external electronic device via the selected at least one antenna. According to an embodiment, another component (e.g., a radio frequency integrated circuit (RFIC)) other than the radiating element may be additionally formed as part of the antenna module 1097.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 1001 and the external electronic device 1004 via the server 1008 coupled with the second network 1099. Each of the electronic devices 1002 and 1004 may be a device of a same type as, or a different type, from the electronic device 1001. According to an embodiment, all or some of operations to be executed at the electronic device 1001 may be executed at one or more of the external electronic devices 1002, 1004, or 1008. For example, if the electronic device 1001 should perform a function or a service automatically, or in response to a request from a user or another device, the electronic device 1001, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 1001. The electronic device 1001 may provide the outcome, with or without further processing of the outcome, as at least part of a reply to the request. To that end, a cloud computing, distributed computing, or client-server computing technology may be used, for example.

The electronic device according to various embodiments may be one of various types of electronic devices. The electronic devices may include, for example, a portable communication device (e.g., a smartphone), a computer device, a portable multimedia device, a portable medical device, a camera, a wearable device, or a home appliance. According to an embodiment of the disclosure, the electronic devices are not limited to those described above.

It should be appreciated that various embodiments of the present disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

As used herein, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 1040) including one or more instructions that are stored in a storage medium (e.g., internal memory 1036 or external memory 1038) that is readable by a machine (e.g., the electronic device 1001). For example, a processor (e.g., the processor 1020) of the machine (e.g., the electronic device 1001) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a compiler or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

The electronic device according to certain embodiments can prevent foreign substances from entering the fingerprint sensor.

The electronic device according to certain embodiments can prevent malfunction of the fingerprint sensor by preventing diffuse reflection of light caused by other components.

While the present disclosure has been shown and described with reference to various embodiments thereof, it will be understood by those skilled in the art that various changes in form and details may be made therein without departing from the present disclosure as defined by the appended claims and their equivalents.

What is claimed is:

1. An electronic device comprising:
   a housing including a window facing in a first direction and a rear plate facing in a second direction opposite the first direction;
   a display disposed between the window and the rear plate, the display including:
      a first layer having a first surface disposed on the window and a second surface that faces in the second direction;
      a second layer having a third surface disposed on the second surface of the first layer, a fourth surface that faces in the second direction, and a first opening; and
      a conductive layer having a fifth surface disposed on the fourth surface of the second layer, a sixth surface that faces in the second direction, and a second opening corresponding to the first opening;
   a flexible printed circuit board (FPCB) extended from at least a portion of the display and disposed on a surface of the display that faces in the second direction, and having a third opening corresponding to the second opening;
   a frame structure on which the display and the FPCB are seated, and which is disposed between the FPCB and the rear plate and has a fourth opening corresponding to the third opening;
   a fingerprint sensor having at least a portion inserted into the fourth opening and facing in the first direction; and
   a dustproof member disposed between the display and the frame structure within the third opening.

2. The electronic device of claim 1, wherein the dustproof member is in contact with at least a portion of the conductive layer.

3. The electronic device of claim 1, wherein the dustproof member is spaced apart from the FPCB and is disposed to surround the fourth opening.

4. The electronic device of claim 1, wherein one surface of the dustproof member is in contact with at least a portion of the conductive layer and at least a portion of the second layer, and
   wherein another surface of the dustproof member is in contact with the frame structure.

5. The electronic device of claim 1, wherein a diameter of the second opening is larger than a diameter of the first opening.

6. The electronic device of claim 1, wherein a diameter of the third opening is larger than diameters of the first opening and the second opening.

7. The electronic device of claim 1, wherein the second layer comprises an adhesive layer and a cushion layer disposed in the second direction of the adhesive layer, and
   wherein the conductive layer is disposed in the second direction of the cushion layer.

8. The electronic device of claim 7, wherein the dustproof member is disposed to cover an edge of the second opening.

9. The electronic device of claim 1, wherein the first layer comprises an adhesive layer disposed on a surface of the window in the second direction, a polarizing layer disposed in the second direction of the adhesive layer, and a pixel layer disposed in the second direction of the polarizing layer.

10. The electronic device of claim 1, wherein the second layer comprises an adhesive layer disposed on the second surface of the first layer that faces in the second direction.

11. The electronic device of claim 1, wherein the fingerprint sensor is configured to acquire fingerprint information of a user contacting the window in the first direction, through the first opening, the second opening, the third opening, and the fourth opening.

12. The electronic device of claim 1, further comprising a battery,
wherein the battery is disposed in a space formed by the frame structure.

13. The electronic device of claim 1, wherein the fingerprint sensor has an angle of view of a designated range, and
wherein an area of the first opening is larger than an area of a region corresponding to the angle of view.

14. The electronic device of claim 13, wherein the designated range is 95° to 135° inclusive.

15. The electronic device of claim 1, wherein the dustproof member comprises a sponge, rubber, or a resin.

16. An electronic device comprising:
a housing including a front cover window and a rear cover;
a display panel disposed under the front cover window, and comprising a plurality of layers, at least one first layer of the plurality of layers forming a first opening and a second layer of the plurality of layers forming a second opening;
a flexible printed circuit board (FPCB) electrically connected with the display panel and disposed on a rear surface of the display panel, and including a third opening corresponding to the first opening;
a fingerprint sensor;
a frame structure disposed between the front cover window and the rear cover, and having the fingerprint sensor and the FPCB disposed therein, and comprising a fourth opening corresponding to the third opening; and
a dustproof member disposed to surround the fingerprint sensor,
wherein the fingerprint sensor is disposed to face a front surface of the electronic device to acquire fingerprints of a user through a space formed by the first opening, the second opening, the third opening, and the fourth opening,
wherein the dustproof member is disposed between the second layer and the frame structure within the third opening.

17. The electronic device of claim 16, wherein the dustproof member is in contact with the first layer and the second layer.

18. The electronic device of claim 16, wherein the second layer comprises metal.

19. The electronic device of claim 16, wherein a diameter of the first opening is smaller than a diameter of the second opening,
wherein the diameter of the second opening is smaller than a diameter of the third opening, and
wherein the diameter of the fourth opening is smaller than the diameter of the first opening.

20. The electronic device of claim 16, wherein the dustproof member is disposed outside a region of the third opening that corresponds to the first opening.

* * * * *